United States Patent
Zheng

(10) Patent No.: US 10,125,017 B2
(45) Date of Patent: Nov. 13, 2018

(54) HYDROGEN GENERATION FROM STABILIZED ALANE

(71) Applicant: Intelligent Energy Inc., San Jose, CA (US)

(72) Inventor: Guanghong Zheng, Westlake, OH (US)

(73) Assignee: Intelligent Energy Inc., San Jose, CA (US)

( * ) Notice: Subject to any disclaimer, the term of this patent is extended or adjusted under 35 U.S.C. 154(b) by 57 days.

(21) Appl. No.: 15/217,344

(22) Filed: Jul. 22, 2016

(65) Prior Publication Data

US 2016/0325989 A1    Nov. 10, 2016

Related U.S. Application Data

(63) Continuation of application No. 13/693,158, filed on Dec. 4, 2012.

(51) Int. Cl.
   *C01B 3/06*       (2006.01)
   *C01B 3/56*       (2006.01)
   *B01J 7/02*       (2006.01)

(52) U.S. Cl.
   CPC ................ *C01B 3/065* (2013.01); *B01J 7/02* (2013.01); *C01B 3/56* (2013.01); *C01B 2203/0405* (2013.01); *Y02E 60/362* (2013.01)

(58) Field of Classification Search
   CPC .............. C01B 3/065; C01B 3/56; B01J 7/02
   See application file for complete search history.

(56) References Cited

U.S. PATENT DOCUMENTS

| | | | |
|---|---|---|---|
| 3,801,707 A | 4/1974 | Ardis et al. | |
| 3,803,082 A | 4/1974 | Roberts et al. | |
| 3,821,044 A | 6/1974 | Roberts | |
| 3,844,854 A | 10/1974 | Self et al. | |
| 3,852,043 A | 12/1974 | Matzek | |
| 3,857,922 A | 12/1974 | Matzek et al. | |
| 3,869,544 A | 3/1975 | Niles et al. | |
| 6,228,338 B1 | 5/2001 | Petrie et al. | |
| 6,617,064 B2 | 9/2003 | Petrie et al. | |

(Continued)

FOREIGN PATENT DOCUMENTS

RU     2175637 C2    11/2001

OTHER PUBLICATIONS

F.M. Brower, et al., "Preparation and Properties of Aluminum Hydride", J. Am. Chem. Soc., 98, 2450 (1976).

(Continued)

*Primary Examiner* — Matthew J Merkling

(74) *Attorney, Agent, or Firm* — Baker & Hostetler LLP

(57) ABSTRACT

A hydrogen generator and a method of producing hydrogen gas using stabilized aluminum hydroxide and water are disclosed. The hydrogen generator contains stabilized aluminum hydride, water, a base, and a reaction chamber within which at least a portion of the stabilized aluminum hydride reacts with at least a portion of the water to produce hydrogen gas. The water that reacts with the stabilized aluminum hydride is contained in a basic aqueous solution including at least a portion of the base. The base can be included with the water in the basic aqueous solution, stored in a reservoir separate from the stabilized aluminum hydroxide, or the base can be a solid contained in a mixture with the stabilized aluminum hydroxide and mix with water when added to the mixture to form the basic aqueous solution.

10 Claims, 2 Drawing Sheets

(56) References Cited

U.S. PATENT DOCUMENTS

| | | |
|---|---|---|
| 6,984,747 B2 | 1/2006 | Jacob et al. |
| 7,238,336 B2 | 7/2007 | Lund et al. |
| 7,959,896 B2 | 6/2011 | Mertens et al. |
| 8,124,288 B2 | 2/2012 | McLean et al. |
| 2001/0038821 A1 | 11/2001 | Petrie et al. |
| 2005/0191234 A1 | 9/2005 | Mertens et al. |
| 2005/0191235 A1 | 9/2005 | Vajo et al. |
| 2006/0257313 A1 | 11/2006 | Cisar et al. |
| 2007/0202037 A1 | 8/2007 | Golden et al. |
| 2008/0152584 A1 | 6/2008 | Anand |
| 2009/0060833 A1 | 3/2009 | Curello et al. |
| 2009/0110975 A1 | 4/2009 | Kim et al. |
| 2009/0274595 A1* | 11/2009 | Fisher ............ B01J 7/02 422/239 |
| 2010/0021376 A1 | 1/2010 | Silberman et al. |
| 2010/0143240 A1 | 6/2010 | Najim et al. |
| 2010/0150824 A1 | 6/2010 | Withers-Kirby et al. |
| 2010/0247426 A1 | 9/2010 | Wallace et al. |
| 2010/0304238 A1 | 12/2010 | Ku et al. |
| 2011/0027667 A1 | 2/2011 | Sugimoto et al. |
| 2011/0104021 A1 | 5/2011 | Curello et al. |
| 2011/0177405 A1 | 7/2011 | Hung et al. |
| 2012/0282166 A1 | 11/2012 | Wallace et al. |

OTHER PUBLICATIONS

A.E. Finholt, A.C. Bond, and H.I. Schlesinger, "Lithium Aluminum Hydride, Aluminum Hydride and Lithium Gallium Hydride, and Some of their Applications in Organic and Inorganic Chemistry", J. Am. Chem_ Soc., 69, 1199 (1947).

J. Graetz, et al., "Aluminum hydride as a hydrogen and energy storage material: Past, present and future", J. Alloys and Compounds, 509S, S517 (2011).

P.B. Kempa, V. Thome, M. Herrmann, "Structure, Chemical and Physical Behavior of Aluminum Hydride", Particle & Particle Systems Characterization, 26, 132 (2009).

J.A. Teprovich, T. Motyka, and R. Zidan, "Hydrogen system using novel additives to catalyze hydrogen release from the hydrolysis of alane and activated aluminum", Inter J of Hydrogen Energy, 37 (2012), 1594-1503.

"Recommendations on the Transport of Dangerous Goods, Manual of Tests and Criteria," Fifth Revised Ed., United Nations, 2009; 456 pages.

"Right to Know, Hazardous Substance Fact Sheet" for Aluminum Hydride, New Jersey Department of Health & Senior Services, Right to Know Program, PO Box 368, Trenton, NJ,; http://www.nj.gov/health/eoh/rtkweb.

Graetz et al.; "Aluminum Hydride, AlH3, as a Hydrogen Storage Compound"; Brookhaven National Laboratory; Report BNL-77336-2006; Nov. 2006.

Treprovich et al.; "Hydrogen System Using Novel Additives to Catalyze Hydrogen Release From The Hydrolysis of Alane And Activated Aluminum"; Int'l Journal of Hydrogen Energy; vol. 37; 2012; p. 1594-1603.

* cited by examiner

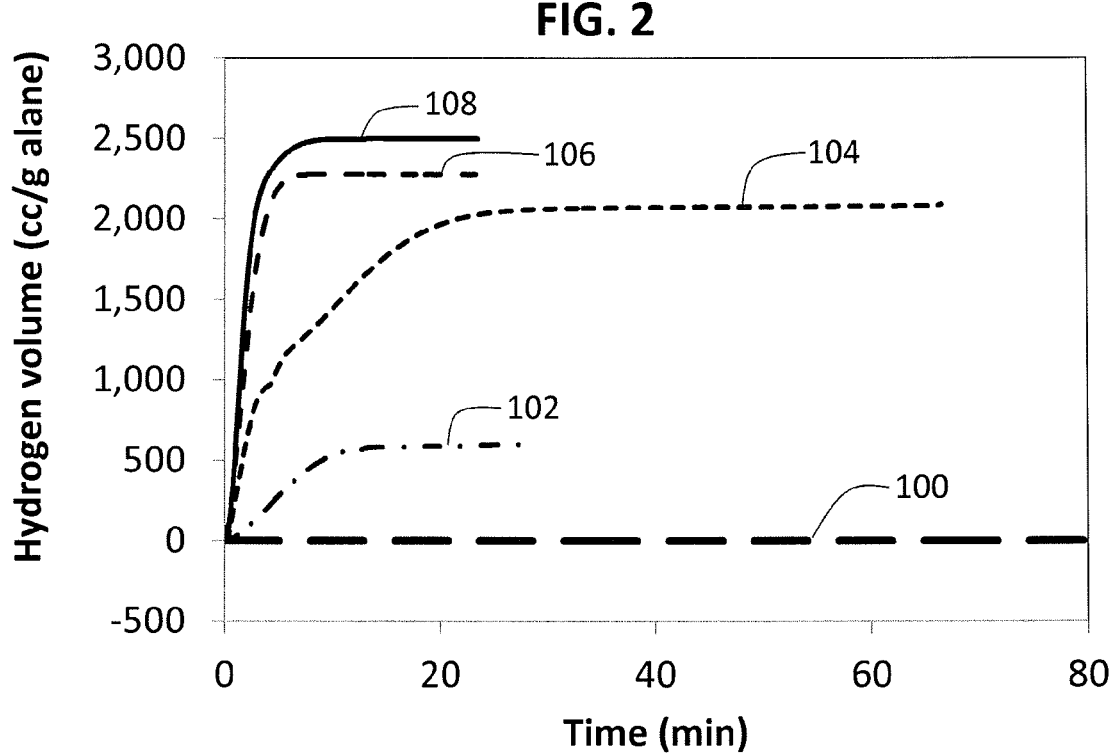
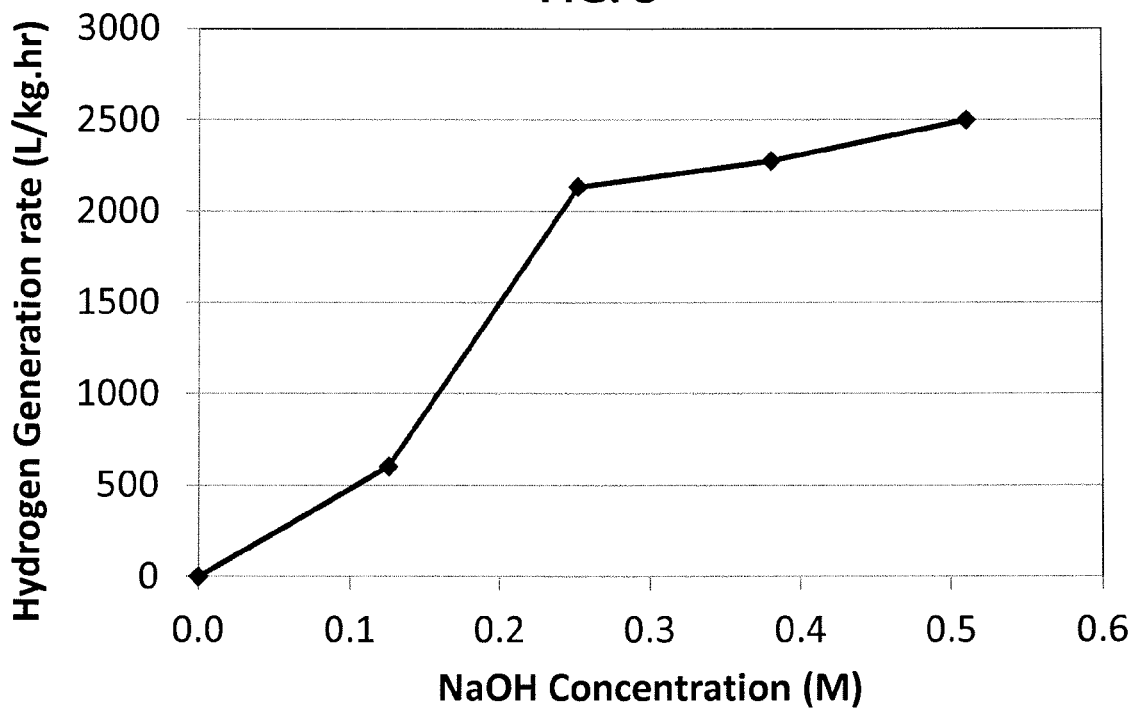

HYDROGEN GENERATION FROM STABILIZED ALANE

CROSS-REFERENCE TO RELATED APPLICATIONS

This patent application is a Continuation of Utility patent application Ser. No. 13/693,158 filed Dec. 4, 2012, the disclosures of which are incorporated by reference in its entirety.

TECHNICAL FIELD

This invention relates to the generation of hydrogen gas from stabilized alane, particularly to the production of hydrogen gas from the hydrolysis of stabilized alane.

BACKGROUND

A key limiting factor in the widespread adoption of proton exchange membrane fuel cell (PEN/WC) based power systems is hydrogen fuel storage. The development of a viable hydrogen storage solution will have a profound impact on how consumers will power portable devices, since batteries simply cannot match demands for runtime, energy density and reliability.

Because hydrogen has poor energy content per volume (0.01 MJ/L at standard temperature and pressure and 8.4 MJ/L for liquid hydrogen vs. 32 MJ/L for petroleum), physical transport and storage as a gas or liquid is impractical. Additionally, the compression process to achieve the pressures necessary to reach a high density is energy-intensive and doesn't solve the hazard issue. Also, the densities of compressed H2 or liquefied H2 are still below those required to reach practical fuel storage goals.

Physical means to store hydrogen include sorbents such as carbon nanotubes and foams, zeolites, metal-organic frameworks; and intermetallics such as titanium-manganese alloy 5800, complex hydrides such as metal alanates, amides, and borohydrides, and chemical hydrides such as sodium borohydride/water and ammonia borane (AB). Despite intensive and elegant work on sorbents and complex hydrides, practical systems that can store and release >6 wt % hydrogen at moderate temperatures are still far from realization.

Aluminum hydride (alane) is an attractive candidate for solid hydrogen storage. Alane's formula is sometimes represented with the formula $(AlH_3)_n$ because it is a polymeric network solid. Alane is formed as numerous polymorphs: the alpha (a), alpha prime (a'), beta ((3), delta (8), epsilon (c), zeta (0, or gamma (y) polymorphs. Each of the polymorphs has different physical properties and varying stability. The most thermally stable polymorph is a-alane, featuring aluminum atoms surrounded by six hydrogen atoms that bridge to six other aluminum atoms. However, alane, including a-alane, is very reactive with water, including moisture in ambient air (e.g., see "Right to Know, Hazardous Substance Fact Sheet" for Aluminum Hydride, available from New Jersey Department of Health & Senior Services, Right to Know Program, PO Box 368, Trenton, N.J. 08625-0368; http://www.nj.gov/health/eoh/rtkweb). For example, It is known that aluminum hydride reacts violently with oxidizing agents and is not compatible with strong acids and metal salts), unless it has been passivated to make it more stable (i.e., stabilized). Consequently, stabilized alane is generally preferred as a hydrogen containing material from which hydrogen gas is generated to prevent loss of a significant portion of the hydrogen from the alane due to wasteful reactions during manufacturing, shipping and storage. The use of stabilized alane can also minimize the need for special packaging and manufacturing under special conditions.

Alane can react to produce aluminum metal and hydrogen gas when heated, according to the following reaction:

$AlH_3 \rightarrow Al + 1.5H_2$ (reaction 1)

Alternatively, alane can also react with water according to the reaction:

$AlH_3 + 3H_2O \rightarrow Al(OH)_3 + 3H_2$ (reaction 2)

However, the hydrolysis of stabilized alane is not normally effective for producing hydrogen gas at a reasonable rate for most applications.

Alane can be prepared by several different processes, such as those disclosed in U.S. Pat. Nos. 3,852,043; 6,228,338; and 6,617,064. Several different processes for stabilizing or reducing the reactivity of alane are disclosed in the prior art, such as: (a) storing in an inert atmosphere below 0° C. for an extended period of time (U.S. Pat. No. 3,852,043); (b) contacting with an aqueous buffer at pH 7 at 70° C. (U.S. Pat. No. 3,821,044); (c) treating with a liquid including an organic compound and a small amount of water (U.S. Pat. No. 3,869,544); and (d) washing with 10 w/w percent HCl (U.S. Pat. No. 6,228,338 and U.S. Pat. No. 6,617,064).

In view of the above, an object of the invention is to provide a method of producing hydrogen gas at a relatively high rate by the hydrolysis of stabilized alane.

Another object of the invention is to provide a hydrogen generator capable of producing hydrogen gas at a relatively high rate by the hydrolysis of stabilized alane.

SUMMARY

The above objects are met and the above disadvantages of the prior art are overcome by reacting stabilized alane with water in a basic aqueous solution to produce hydrogen gas.

One aspect of the present invention is a method of producing hydrogen gas, the method including the steps of providing stabilized aluminum hydride, a base and water, and reacting at least a portion of the stabilized aluminum hydride with at least a portion of the water to produce hydrogen gas, wherein the water that reacts with the stabilized aluminum hydride is in a basic aqueous solution including at least a portion of the base. Embodiments of the method can include the following, alone or in combination.

the stabilized aluminum hydride includes alpha aluminum hydride;

the stabilized aluminum hydride includes particles of aluminum hydride with a crystallite size having a D50 value of greater than 1 µm; the D50 value can be 100 IIM or less;

the stabilized aluminum hydride includes particles with a passivation layer; the passivation layer can have a thickness of less than 100 nm; the passivation layer can have a thickness of at least 1 nm; the passivation layer can include at least one of an oxide of aluminum, a hydroxide of aluminum and a combination thereof;

the basic aqueous solution is formed by mixing the base and the water and then contacting the solution with the stabilized aluminum hydride; the basic aqueous solution is at least a 0.01 molar and preferably at least a 0.1 molar solution of the base; the base can include at least one of sodium hydroxide, potassium hydroxide, lithium hydroxide, calcium hydroxide, sodium carbonate, sodium amide and alkyl-lithium; the basic solution can have a pH of 12 or greater;

the basic aqueous solution is formed as the water is brought in contact with a mixture of a solid base and stabilized aluminum hydride; the solid base can be at least one of a hydroxide, a hydride, a borohydride and an alanate; the solid base is preferably at least one of a hydride, a borohydride and an alanate that can initially react with the water to produce hydrogen gas;

the molar ratio of water to stabilized aluminum hydride is greater than 3;

the molar ratio of base to alane is greater than 0.0005;

no heat is added during production of the hydrogen gas; and the reaction of the water and the stabilized aluminum hydride is capable of producing hydrogen gas at a rate of greater than 1.0 liter of hydrogen gas per kilogam of stabilized aluminum hydride per hour at without providing additional heat, the reaction of the water and the stabilized aluminum hydride is preferably capable of producing up to 100 liters and more preferably up to 500 liters of hydrogen gas per kilogram of stabilized aluminum hydride per hour.

A second aspect of the invention is a hydrogen generator for producing hydrogen gas, the hydrogen generator including stabilized aluminum hydride, water, a base, and a reaction chamber within which at least a portion of the stabilized aluminum hydride reacts with at least a portion of the water to produce hydrogen gas; wherein the water that reacts with the stabilized aluminum hydride is in a basic aqueous solution including and at least a portion of the base. Embodiments of the hydrogen generator can include the following, alone or in combination.

the stabilized aluminum hydride includes alpha aluminum hydride;

the stabilized aluminum hydride includes particles of aluminum hydride with a crystallite size having a D50 value of greater than 1 µm; the crystallite D50 value can be 100 p.m or less;

the stabilized aluminum hydride includes particles with a passivation layer; the passivation layer can have a thickness of less than 100 nm; the passivation layer can have a thickness of at least 1 nm; the passivation layer can include at least one of an oxide of aluminum, a hydroxide of aluminum and a combination thereof;

the water is stored in a reservoir separate from the stabilized aluminum hydroxide; the water and the base can be part of the basic solution, and the basic solution can be stored in the reservoir; the basic aqueous solution can include at least 0.01 molar and preferably at least 0.1 molar base; the base can include at least one of sodium hydroxide, potassium hydroxide, lithium hydroxide, calcium hydroxide, sodium carbonate, sodium amide and alkyl-lithium; the basic solution can have a pH of 12 or greater;

the stabilized aluminum hydride and the base are contained in the hydrogen generator as a solid mixture; the water can be stored in a separate reservoir; the base can be at least one of a hydroxide, a hydride, a borohydride and an alanate; the solid base is preferably at least one of a hydride, a borohydride and an alanate that can initially react with the water to produce hydrogen gas;

the molar ratio of water to stabilized aluminum hydride is greater than 3;

the molar ratio of base to alane is greater than 0.0005;

the hydrogen generator includes no heater;

the reaction of the water and the stabilized aluminum hydride is capable of producing hydrogen gas at a rate of greater than 1.0 liter of hydrogen gas per kilogram of stabilized aluminum hydride per hour at without providing additional heat, the reaction of the water and the stabilized aluminum hydride is preferably capable of producing up to 100 liters and more preferably up to 500 liters of hydrogen gas per kilogram of stabilized aluminum hydride per hour; and the reaction of the stabilized aluminum hydroxide with the water is controllable by controlling transport of the water from a reservoir to the stabilized aluminum hydroxide to produce hydrogen gas on an as needed basis.

These and other features, advantages and objects of the present invention will be further understood and appreciated by those skilled in the art by reference to the following specification, claims and appended drawings.

Unless otherwise specified, the following definitions and methods are used herein:

a-alane (alpha-alane) is aluminum hydride with a cubic, rhombohedral or hexagonal morphology; and stabilized alane is aluminum hydride that is not classified as a Division 4.3 material for transportation according to the United Nations "Recommendations of the Transport of Dangerous Goods, Model Regulations" and the "Globally Harmonized System of Classification and Labelling of Chemicals (GHS);" in particular, stabilized alane is aluminum hydride that is not classified in Division 4.3 if, when tested according to § 33.4.1.1, Substances which in contact with water emit flammable gasses, "Recommendations of the Transport of Dangerous Goods, Manual of Tests and Criteria," the rate of emission of any hydrogen gas evolved on the test is equal to or less than 1 liter of hydrogen per kilogram of alane per hour.

Unless otherwise specified herein, all disclosed characteristics and ranges are as determined at room temperature (20-25° C.).

BRIEF DESCRIPTION OF THE DRAWINGS

In the drawings:

FIG. 2 is a graph of cumulative hydrogen volume evolved as a function of time for stabilized alane in water containing from 0 to 0.51 molar sodium hydroxide; and FIG. 3 is a graph of average hydrogen gas evolution rate as a function of sodium hydroxide concentration during the first hour of reaction.

DESCRIPTION

Figure 1:
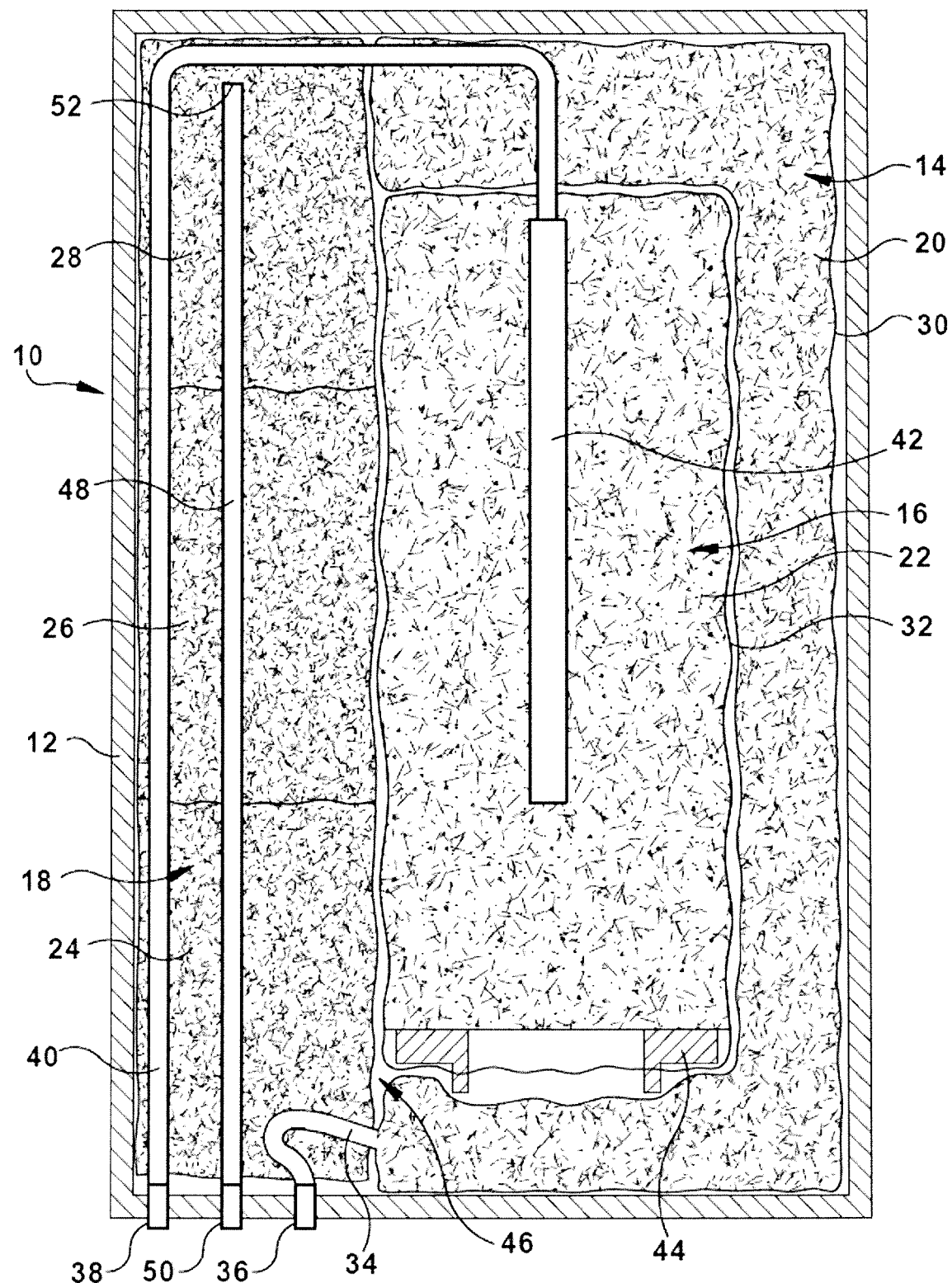
FIG. 1 is a cross-sectional drawing of an embodiment of a hydrogen generator.

The present invention provides a method of producing hydrogen gas at a relatively high rate by the hydrolysis of stabilized alane. A preferred form of alane is a-alane, which can have a cubic, rhombohedral or hexagonal morphology. A preferred stabilized alane has particles or agglomerates of particles having a passivation layer that renders the alane essentially stable when in contact with water or moisture in the air. The composition of the passivation layer can vary, depending on the method of stabilization. In one embodiment the passivation layer includes one or a combination of oxides and hydroxides of aluminum (e.g., aluminum oxyhydroxide, aluminum hydroxide and aluminum (III) oxide). Preferably the alane size will have a $D_{50}$ value greater than 1.0 p.m. Preferably the $D_{50}$ value is no greater than 100 p.m. If the crystallites are too small the total surface area will be large and the hydrogen gas output will be reduced, and if the crystallites are too large the particles will be easily fractured and passivation layers will be broken down during processing. Preferably the thickness of the passivation layer is less than 100 nm. Preferably the thickness of the passivation layer is at least 1 nm. If the passivation layer is too thick the overall hydrogen content will be reduced and the alane may not react as desired during use, and if the passivation layer is too thin the alane will not be as stable as desired.

Stabilized alane produces little or no hydrogen gas when exposed to water or to ambient air for up to 24 hours. Test N.5 (described in § 33.4.1.4 of the "Recommendations on the Transport of Dangerous Goods, Manual of Tests and Criteria," Fifth revised edition, United Nations, 2009) can be used to determine if alane is stabilized alane as defined herein. The test method includes four subtests, the first three to determine if the alane reacts violently with water or spontaneous ignition of any gas produced occurs (the first three subtests may be skipped if it is already known that the alane does reacts violently with water and spontaneous ignition of any gas produced does not occur. In the first subtest small quantity (approximately 2 mm diameter) of the alane to be tested is placed in a trough of distilled water at 20° C.; in the second subtest a small quantity of the alane (approximately 2 mm diameter) is placed on the center of a filter paper which is floated flat on the surface of distilled water at 20° C. in a suitable vessel; and in the third subtest alane is placed in a pile approximately 20 mm high and 30 mm diameter with a hollow in the top, and a few drops of water are added to the hollow. For the fourth subtest:

This test should be performed three times at ambient temperature (20° C.) and atmospheric pressure. Water is put into the dropping funnel and enough of the substance (up to a maximum mass of 25 g) to produce between 100 ml and 250 ml of gas is weighed and placed in a conical flask. The tap of the dropping funnel is opened to let the water into the conical flask and a stop watch is started. The volume of gas evolved is measured by any suitable means. The time taken for all the gas to be evolved is noted and where possible, intermediate readings are taken. The rate of evolution of gas is calculated over 7 hours at 1 hour intervals. If the rate of evolution is erratic or is increasing after 7 hours, the measuring time should be extended to a maximum time of 5 days. The five day test may be stopped if the rate of evolution becomes steady or continually decreases and sufficient data has been established to assign a packing group to the substance or to determine that the substance should not be classified in Division 4.3. If the chemical identity of the gas is unknown, the gas should be tested for flammability.

If the alane tested in the fourth subtest does not react violently with the water or evolve gas at a rate of greater than 1 liter of hydrogen per kilogram of alane per hour at any time during the test, and there is no spontaneous ignition of any gas produced during the test, the alane is considered to be stabilized alane as defined herein.

It is known that the rate of reaction between metal hydrides and water to produce hydrogen gas can be a function of the pH of the reaction solution. For example, U.S. Patent Publication No. 2010/0150824 discloses that the hydration reaction typically proceeds at a faster pace at low pHs, and the addition of an acid to the reactant may accelerate the evolution of hydrogen gas (paragraph [0114]); and it may be desirable in some circumstances to increase the pH to make the composition less reactive and safer to handle (paragraph [0118]).

It has been discovered that lowering the pH of a reaction solution of stabilized alane in water does not substantially increase the rate of evolution of hydrogen gas. It is believed that this is because the acid solution does not reduce the passivation layer on the surface of the alane; in fact, the acid solution may prevent the disruption of the passivation layer or even add to it. Contrary to the conventional knowledge that the rate of hydrogen gas evolution increases with decreasing pH, it has been found that by making the reaction solution basic the reaction rate of stabilized alane is increased. It has also been discovered that, at least to a point, the more base that is added to the water, the greater the rate of hydrogen gas evolution. Based on the above discoveries, a method for producing hydrogen gas from stabilized alane and water has been developed. It includes either mixing a base with water to form a basic aqueous solution that is then brought into contact with the stabilized alane or mixing a solid base with stabilized alane and bringing the water into contact with the alane/base mixture to form a basic aqueous solution so water with a high pH can react with the stabilized alane to produce hydrogen gas.

Preferably the ratio of water/stabilized alane is greater than about 3 and more preferably greater than about 5. Preferably the ratio of water/stabilized alane is no greater than about 20 and more preferably no greater than about 10. Preferably the molar ratio of base/stabilized aluminum hydride is greater than about 0.0005 and more preferably greater than about 0.002. to about 0.2, Preferably the molar ratio of base/stabilized aluminum hydride is no greater than about 2 and more preferably no greater than about 1.

When the base is mixed with water in advance, the resultant basic aqueous solution is preferably at least a 0.01 molar solution, and more preferably at least a 0.1 molar solution of the base. Preferably the pH of the solution is at least 12, and more preferably at least 14.

Suitable bases will preferably be stable in an aqueous solution and be soluble in water at the desired concentration and across the temperature range at which the basic solution is expected to be used. Preferably the base will have a high solubility in water, a low molecular weight, and high activity with the passivation layer of the alane. Suitable bases include hydroxides (such as those of sodium, potassium, lithium and calcium), sodium carbonate, sodium amide and alkyl-lithium. If the base is a solid mixed with the alane, other bases can be used, including those that can initially react with the water when it is added to the solid alane/base mixture; examples of such bases include hydrides (e.g., those of lithium, sodium and potassium), borohydrides (e.g., those of sodium, lithium, potassium and calcium), and alanates (e.g., sodium, lithium and potassium aluminum hydride).

Preferably the reaction of the water and stabilized alane will be capable of producing hydrogen gas at a rate of greater than 1.0 liter per kilogram of stabilized alane per hour for at least short periods of time, though the reaction may be controlled to produce hydrogen gas at a slower rate or intermittently in order to provide hydrogen gas only as needed. More preferably the maximum rate of hydrogen generation will be at least 100 liters per kilogram, and most preferably at least 500 liters per kilogram of stabilized alane per hour.

Stabilized alane can be added to a basic aqueous solution in a reaction chamber, the basic solution can be added to stabilized alane in a reaction chamber, or both the basic solution and the stabilized alane can be added to a reaction chamber. A hydrogen generator using a basic aqueous solution and stabilized alane as reactants can use any of these methods. For example, one or both of the solution and the stabilized alane can be contained in a storage container and transported to a reaction chamber where the solution and the stabilized alane come in contact and react to produce hydrogen gas. In another embodiment, the stabilized alane and water at a neutral or acidic pH can be present together, with a base added to the water to raise the pH and cause the water and the stabilized alane to react. The storage container(s) can be replaceable or refillable to allow the hydrogen generator to be recharged with fresh reactants. The reaction chamber can be emptied or replaced to remove reaction byproducts (e.g., metallic aluminum). In this way, other components of the hydrogen generator can be reused, making the hydrogen generator more economical to use.

Any suitable means can be used to transport one or more of the water, base, solution and stabilized alane from a storage container to the reaction chamber. For example, a liquid (water, basic solution or liquid base) can be pumped or forced by the application of pressure on or within the storage container to flow into the reaction chamber. The stabilized alane can be in a flowable particulate form (e.g., a dry powder or granular form, or in a slurry with a liquid slurry). Dry stabilized alane can be transported using a mechanical device such as a hopper, gravity, auger or screw feeder. Stabilized alane in a slurry can be transported by pumping or otherwise flowing under pressure. Because transporting stabilized alane may be more difficult than transporting a liquid, it may be desirable to store the stabilized alane in one or more reaction chambers (or multiple compartments in the reaction chamber). The generation of hydrogen gas can be controlled in various ways; e.g., by controlling the rate and amount of liquid that is transported to the reaction chamber and by controlling the amount and location of stabilized alane that is contacted by the basic solution at any given time. A controller can be used to control the reaction of the water and the stabilized alane, based on the demand for hydrogen gas from the hydrogen generator for example.

A hydrogen generator producing hydrogen gas from the hydrolysis reaction of water and stabilized alane at a basic pH will contain a basic aqueous solution and the stabilized alane and a reaction chamber within which at least a portion of the solution and the stabilized alane can contact each other and react. The basic aqueous solution can be provided to the hydrogen generator (e.g., by filling a storage container or inserting a filled storage container in the hydrogen generator), or water and a concentrated base can be provided separately and mixed within the hydrogen generator. The stabilized alane can be provided by filling or inserting a storage container or reaction chamber.

An embodiment of a hydrogen generator is shown in FIG. 1. The hydrogen generator 10 includes a liquid reservoir 14, a reaction area 16 and an effluent storage area 18 within a housing 12. Water 20 is contained within the reservoir 14, and stabilized alane 22 is contained within the reaction area 16. The effluent storage area 18 includes a filter, which can have one or more filter components, such as three filter components 24, 26, 28. The reservoir 14 is enclosed by an enclosure 30. The reaction area 16 can be at least partially enclosed by an optional enclosure 32. The effluent storage area 18 can be enclosed by an optional enclosure (not shown). The effluent storage area 18 is in a volume exchanging relationship with at least one of the reactant storage area 14 and the reaction area 16. During use of the hydrogen generator 10 the water 20 is transported from the reactant storage area 14 to the reaction area 16 through a liquid outlet passage 34 by a pump 54, preferably located externally. The water 20 can be pumped through the liquid outlet passage 34, such as a tube, and an outlet connection 36 to the pump. The water 20 can flow to the reactant area 16 through a liquid inlet passage 40, such as a tube. The water 20 exits the liquid inlet passage 40 though a dispersing member 42 to disperse the water over a larger portion of the reaction area 16. The stabilized alane 22 can be in a convenient form such as a pellet, which can include a mixture containing optional additives. As the water 20 comes in contact with the stabilized alane 22 they react to produce hydrogen gas. The water 20 can included with a base in a basic aqueous solution stored in the reservoir 14, or the base can be included in the mixture with the stabilized alane 22 and dissolve in the water 20 as the water 20 is added to the reaction area. The hydrogen gas flows out of the reaction area 22 and through an effluent passage to an effluent entryway 46, where it enters the effluent storage area 18. The hydrogen gas carries with it effluent that includes reaction byproducts as well as unreacted water and stabilized alane. The effluent exits the reaction area 16 though an aperture in the enclosure 32. The opening in the reaction area enclosure 32 can include an effluent exit nozzle 44, which can help keep the aperture open. Hydrogen gas and effluent entering the effluent storage area 18 through the effluent entryway 46 flows through the filters 24, 26, 28 toward a distal portion of the effluent storage area 18. As the hydrogen gas and effluent flow through the filters 24, 26, 28, hydrogen gas is separated from solid particles of the effluent by the filters 24, 26, 28. The hydrogen gas is separated from liquids and any remaining solids in the effluent before exiting the hydrogen generator 10 by a hydrogen permeable, liquid impermeable material 58. The hydrogen gas flows from the distal portion of the effluent storage area 18 to the hydrogen outlet connection 50 through a hydrogen outlet passage 48, from its distal end 52 to a hydrogen outlet connection 50, where it can exit the hydrogen generator.

The following examples illustrate the invention and its advantages.

Example 1

Stabilized a-alane was tested on test N.5, described above. In subtests 1 to 3, no gas generation or ignition was observed. In phase 4, 133 mg of stabilized was placed on the bottom of a 125 $cm^3$ sidearm (Buchner) flask. About 8 g of distilled water (enough to flood the stabilized alane sample) was added to the flask by opening a tap in a dropping funnel that closed the top of the flask. The tap was immediately closed. An apparatus had been set up to measure the volume of gas evolved during the test by water displacement. No evolved gas was observed or measured was over three days. The fourth subtest was repeated two times with the same results. This testing confirmed that the alane tested was stabilized alane as defined herein.

To the stabilized alane remaining from the first three subtests was added hydrogen peroxide, sulfuric acid and potassium hydroxide solution, respectively. The stabilized alane did not react with the hydrogen peroxide or sulfuric acid, but it did react with the potassium hydroxide solution as follows. About 9 g of 6.0 molar (27 weight percent) potassium hydroxide solution (pH 15) was added to the stabilized alane remaining in the sidearm flask at the end of the three day test. A reaction started immediately when the potassium hydroxide was added, then the reaction stopped and the solution became clear after about 10 minutes. A total of 333 $cm^3$ of evolved gas was measured. The calculated theoretical amount of hydrogen that would be produced from 133 mg of alane according to reaction 2 above is 26.87 mg, or 323 cm³ at 20° C., which is consistent with the measured volume of 333 cm³, since it was observed that the gas measurement apparatus had gotten warm during the test as a result of heat produced by the reaction. This testing showed that the reaction of stabilized alane and water is not accelerated (or even initiated) with water with a pH below 7, but that a basic aqueous solution can react with stabilized alane.

Example 2

To determine a relationship between stabilized alane and the pH and concentration of a basic aqueous solution, stabilized a-alane was reacted with water at different concentrations of base to determine the effect of pH of the solution on the rate at which hydrogen gas is evolved. The test method used was test N.5, subtest 4, as described above. For each test 10 cm³ of deionized water or deionized water containing sodium hydroxide was added to approximately 150 mg of stabilized a-alane powder, measuring the cumulative volume of hydrogen gas evolved during the test. The results are shown in FIG. 2, in which time in minutes is on the x-axis and the cumulative volume of hydrogen gas evolved per gram of stabilized alane is on the y-axis. Line 100 represents the results with water containing no sodium hydroxide, line 102 represents the results with water containing 0.13 molar (0.5 weight percent) sodium hydroxide solution (pH 13.0), line 104 represents the results with water containing 0.25 molar (1.0 weight percent) sodium hydroxide solution (pH 13.3), line 106 represents the results with 0.38 molar (1.5 weight percent) sodium hydroxide solution (pH 13.4), and line 108 represents the results with 0.51 molar (2.0 weight percent) sodium hydroxide solution (pH 13.6). Stabilized alane immersed in water with no sodium hydroxide for 24 hours produced no measurable amount of hydrogen gas, confirming that the alane being tested was stabilized alane. Each of the other samples, in which basic aqueous solution was added to stabilized alane, evolved hydrogen gas, with the initial rate of hydrogen gas evolution being greater the higher concentrations of sodium hydroxide. With a basic solution containing 0.51 molar sodium hydroxide, essentially all of the stabilized alane reacted (a 100 percent yield) in less than 10 minutes.

These results show that stabilized alane does not readily react with water to produce hydrogen gas, but adding at least 0.13 molar sodium hydroxide to the water causes the water and the stabilized alane to react, and the greater the sodium hydroxide concentration (up to at least 0.51 molar), the greater the initial rate of the reaction, and reaction rate levels off such that little or no additional hydrogen gas is evolved.

The results are replotted in the graph in FIG. 3 to show the average hydrogen gas generation rate (in liters of hydrogen gas per kilogram of stabilized alane per hour) as a function of sodium hydroxide concentration (in weight percent of solution) during the first hour on test. This graph shows a significant increase in the average hydrogen evolution rate as the sodium hydroxide concentration increases to 1.0 weight percent, but a relatively small increase in rate from 0.25 to 0.51 molar sodium hydroxide.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. A hydrogen generator comprising:
a housing;
a first enclosure within the housing configured to contain water;
a second enclosure within the housing configured to contain a solid fuel mixture comprising stabilized alane, wherein the second enclosure is in fluid communication with the first enclosure via a liquid outlet passage by a pump external to the housing and connected to a liquid inlet passage having a dispersing member to disperse water to facilitate a reaction between water and the solid fuel mixture to yield substantially hydrogen and reaction effluents;
a third enclosure within the housing configured to contain a plurality of filters to selectively separate solid particles from the reaction effluents, wherein said third enclosure is in fluid communication with the second enclosure via an aperture surrounded by an effluent exit nozzle, an effluent passage and an effluent entryway; and,
a hydrogen membrane element within the housing configured to selectively separate hydrogen from the reaction effluents and route hydrogen to an outlet port in said hydrogen generator;
wherein hydrogen is generated by feeding water to the solid fuel mixture to produce hydrogen and reaction effluents; and, wherein at least one of the first enclosure and second enclosure, are in a volume exchange relationship with third enclosure to minimize the volume of the hydrogen generator.

2. The hydrogen generator claim 1, wherein the hydrogen membrane element is composed of hydrogen permeable and liquid impermeable material and is disposed to be in fluid communication with the third enclosure.

3. The hydrogen generator claim 1, wherein the hydrogen membrane element is composed of hydrogen permeable and liquid impermeable material and is disposed outside the third enclosure and in fluid communication with the third enclosure.

4. The hydrogen generator of claim 1, wherein the solid fuel mixture comprises stabilized alane and a solid base, and wherein the solid base preferably comprises one of a hydroxide, a hydride, a borohydride and an alanate.

5. The hydrogen generator of claim 3, wherein a molar ratio of solid base to stabilized alane is preferably greater than 0.0005, and more preferably between about 0.002 and 0.2.

6. The hydrogen generator of claim 1, wherein water from the first enclosure is fed to the solid fuel mixture in the second enclosure at a molar ratio of water to stabilized alane that is preferably greater than 3, and more preferably greater than 5.

7. A hydrogen generator comprising:
a housing;
a first enclosure within the housing configured to contain a liquid reactant comprising water and a base;
a second enclosure within the housing configured to contain a solid fuel comprising stabilized alane, wherein the second enclosure is in fluid communication with the first enclosure via a liquid outlet passage by a pump external to the housing and connected to a liquid inlet passage having a dispersing member to disperse water to facilitate a reaction between water and the solid fuel mixture to yield substantially hydrogen and reaction effluents;

a third enclosure within the housing configured to contain a plurality of filters to selectively separate solid particles from the reaction effluents, wherein said third enclosure is in fluid communication with the second enclosure via an aperture surrounded by an effluent exit nozzle, an effluent passage and an effluent entryway; and, a hydrogen membrane element within the housing configured to selectively separate hydrogen from the reaction effluents and route hydrogen to an outlet port in said hydrogen generator, wherein hydrogen is generated by feeding the liquid reactant to the solid fuel mixture to produce hydrogen and reaction effluents; and, wherein at least one of the first enclosure and second enclosure, are in a volume exchange relationship with third enclosure to minimize the volume of the hydrogen generator.

8. The hydrogen generator of claim 7, wherein the base comprises at least one of sodium hydroxide, potassium hydroxide, lithium hydroxide, calcium hydroxide, sodium carbonate, sodium amide and alkyl lithium.

9. The hydrogen generator of claim 7, wherein the concentration of the base in the liquid reactant is preferably between 0.01M and 1M, and more preferably between 0.1M and 1M.

10. The hydrogen generator of claim 7, wherein the stabilized alane comprises particles of alane with a crystallite size having a D50 value between about 1 micrometer and about 100 micrometer.

\* \* \* \* \*